(12) United States Patent
Yamano

(10) Patent No.: US 11,715,841 B2
(45) Date of Patent: Aug. 1, 2023

(54) FUEL CELL STACK COMBINING METHOD

(71) Applicant: HONDA MOTOR CO., LTD., Tokyo (JP)

(72) Inventor: Naoki Yamano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/678,026

(22) Filed: Feb. 23, 2022

(65) Prior Publication Data
US 2022/0320563 A1 Oct. 6, 2022

(30) Foreign Application Priority Data
Mar. 30, 2021 (JP) .................. 2021-058189

(51) Int. Cl.
*H01M 8/04* (2016.01)
*H01M 8/249* (2016.01)
*H01M 8/04537* (2016.01)

(52) U.S. Cl.
CPC ....... *H01M 8/249* (2013.01); *H01M 8/04619* (2013.01)

(58) Field of Classification Search
CPC .......... H01M 8/249; H01M 8/04619
See application file for complete search history.

(56) References Cited

U.S. PATENT DOCUMENTS

2010/0216043 A1* 8/2010 Gottmann ......... H01M 8/04753
429/432
2022/0190597 A1* 6/2022 Tural ..................... H02J 3/381

FOREIGN PATENT DOCUMENTS

JP 2010172122 A 8/2010

* cited by examiner

*Primary Examiner* — Olatunji A Godo
(74) *Attorney, Agent, or Firm* — CKC & Partners Co., LLC

(57) ABSTRACT

A fuel cell system includes fuel cell modules connected in parallel and each including fuel cell stacks connected in series. A tester includes: an output power acquirer that acquires an output power value for each fuel cell stack; a deterioration estimator that estimates a degree of future deterioration for each fuel cell stack; and a future output power estimator that estimates, for each fuel cell stack, a future output power value, which is a value of power that is likely to be outputted after a specific period of time has passed, based on the degree of future deterioration estimated by the deterioration estimator. The fuel cell stack combining method includes determining combinations of the fuel cell stacks based on differences in the output power value between the fuel cell stacks and differences in the future output power value between the fuel cell stacks.

9 Claims, 7 Drawing Sheets

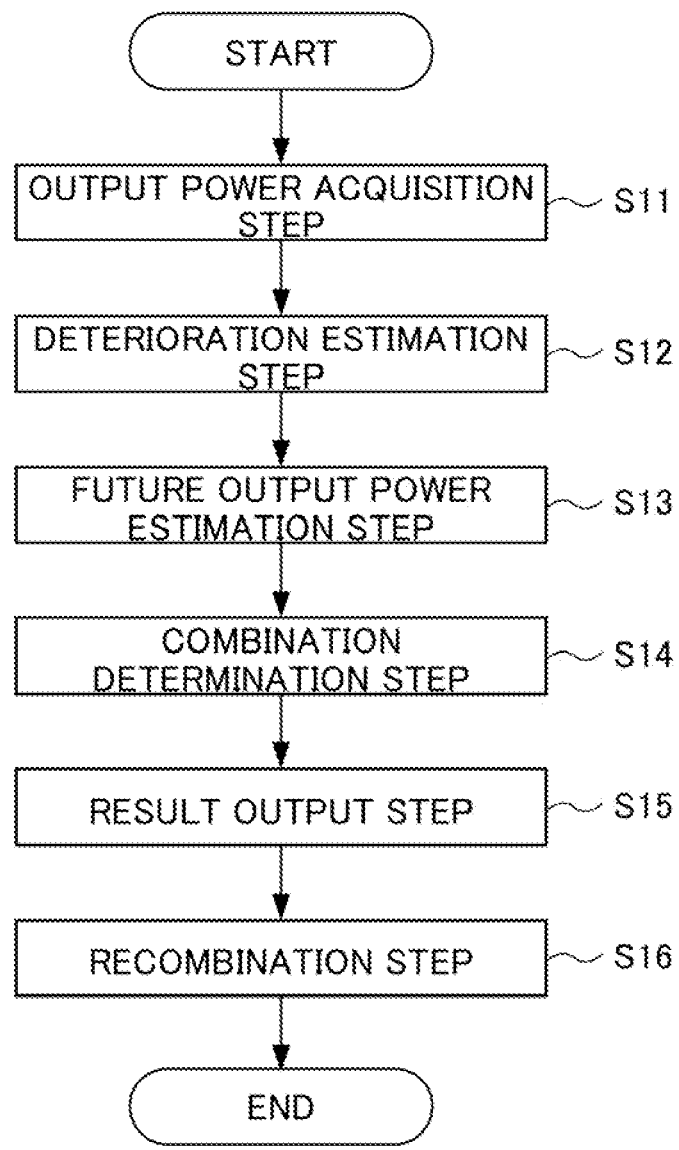

POWER GENERATION CHARACTERISTICS OF
FUEL CELL STACK AS FUEL CELL

CHARACTERISTICS AND PREDICTED
DETERIORATION OF DIFFERENT FCS

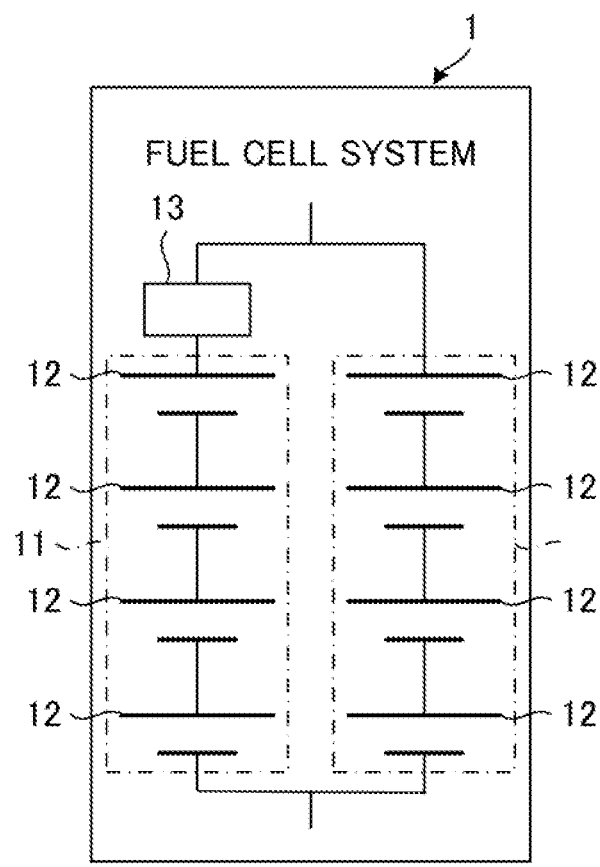

FUEL CELL STACK COMBINING METHOD

This application is based on and claims the benefit of priority from Japanese Patent Application 2021-058189, filed on 30 Mar. 2021, the content of which is incorporated herein by reference.

BACKGROUND OF THE INVENTION

Field of the Invention

The present invention relates to a fuel cell stack combining method.

Related Art

A conventional technique for battery replacement has been proposed that includes measuring the current deterioration state of each of a plurality of battery modules that form a used battery and combining battery modules that satisfy a user's demand for battery replacement based on results of the measurement (see, for example, Patent Document 1). According to this technique, a favorable combination of battery modules is achieved by measuring the current deterioration state.

Patent Document 1: Japanese Unexamined Patent Application, Publication No. 2010-172122

SUMMARY OF THE INVENTION

However, the technique disclosed in Patent Document 1 does not take into account future deterioration of the battery modules that can result from future use. In terms of achieving a more favorable combination of battery modules, therefore, there is still room for improvement.

In the case of a system that includes a plurality of parallel-connected fuel cell modules and that does not have a voltage controller such as a fuel cell voltage control unit (FCVCU), the voltages of the fuel cell modules are the same as one another. Due to the fuel cell modules having the same voltage, which is a characteristic of a parallel circuit, variations in current-voltage characteristics, if any, between the plurality of fuel cell modules can interfere with power output from a fuel cell module having lower characteristics. In such a case, in particular, it is necessary to determine favorable combinations of fuel cell stacks that form the fuel cell modules.

The present invention was achieved in consideration of the above-described circumstances and an objective thereof is to provide a fuel cell stack combining method that makes it possible to determine more favorable combinations of fuel cell stacks that form fuel cell modules.

(1) A fuel cell stack combining method according to an aspect of the present invention is a method for determining combinations of a plurality of fuel cell stacks (for example, fuel cell stacks 12 described below) that form a fuel cell system (for example, a fuel cell system 1 described below) using a tester (for example, a tester 2 described below). The fuel cell system includes a plurality of fuel cell modules (for example, fuel cell modules 11 described below) each including a set of fuel cell stacks from the plurality of fuel cell stacks, the plurality of fuel cell modules being connected in parallel to one another, the set of fuel cell stacks being connected in series to one another. The tester includes: an output power acquirer (for example, an output power acquirer 21 described below) configured to acquire an output power value for each of the plurality of fuel cell stacks; a deterioration estimator (for example, a deterioration estimator 22 described below) configured to estimate a degree of future deterioration for each of the plurality of fuel cell stacks; and a future output power estimator (for example, a future output power estimator 23 described below) configured to estimate, for each of the plurality of fuel cell stacks, a future output power value based on the degree of future deterioration estimated by the deterioration estimator, the future output power value being a value of power that is likely to be outputted after a specific period of time has passed. The fuel cell stack combining method includes determining combinations of the plurality of fuel cell stacks based on differences in the output power value between the plurality of fuel cell stacks and differences in the future output power value between the plurality of fuel cell stacks.

In the fuel cell stack combining method according to the aspect of the present invention described in (1), combinations of the plurality of fuel cell stacks are determined based on differences in the output power value between the plurality of fuel cell stacks and differences in the future output power value between the plurality of fuel cell stacks estimated based on the degree of future deterioration. The method according to the aspect of the present invention described in (1) therefore makes it possible to determine more favorable combinations with the degree of future deterioration of each of the fuel cell stacks taken into account than a method in which combinations of a plurality of fuel cell stacks are determined based only on differences in the output power value between the plurality of fuel cell stacks.

(2) The fuel cell stack combining method according to the aspect of the present invention described in (1) may further include: acquiring an output power value for each of the plurality of fuel cell modules by adding up the output power values of the set of fuel cell stacks included in the fuel cell module; estimating a future output power value for each of the plurality of fuel cell modules by adding up the future output power values of the set of fuel cell stacks included in the fuel cell module; and determining combinations of the plurality of fuel cell stacks based on a difference in the output power value between the plurality of fuel cell modules and a difference in the future output power value between the plurality of fuel cell modules.

In the fuel cell stack combining method according to the aspect of the present invention described in (2), the output power value and the future output power value are acquired for each of the fuel cell modules each including a set of fuel cell stacks connected in series to one another, and combinations of the plurality of fuel cell stacks are determined based on the output power value and the future output power value acquired. Thus, it is possible to determine combinations of the fuel cell stacks so as to achieve an optimal combination of the fuel cell modules.

(3) In the fuel cell stack combining method according to the aspect of the present invention described in (1), combinations of the plurality of fuel cell stacks may be determined so that a sum of the output power values of the set of fuel cell stacks is the smallest possible value based on a difference between the largest value and the smallest value of the output power values of the plurality of fuel cell stacks, and a difference between the largest value and the smallest value of the future output power values of the plurality of fuel cell stacks.

In the fuel cell stack combining method according to the aspect of the present invention described in (3), combinations of the plurality of fuel cell stacks are determined so that the sum of the output power values of the set of fuel cell stacks is the smallest possible value based on the difference between the largest value and the smallest value of the output power values of the plurality of fuel cell stacks, and the difference between the largest value and the smallest value of the future output power values of the plurality of fuel cell stacks. It is therefore possible to effectively utilize each of the fuel cell stacks and to reduce variations in power load during operation thereof while ensuring a wider power draw range. Thus, it is possible to determine favorable combinations of the fuel cell stacks so as to contribute to longevity of the fuel cell stacks.

(4) In the fuel cell stack combining method according to an aspect of the present invention, combinations of the plurality of fuel cell stacks may be determined so that a sum of a difference between the largest value and the smallest value of the output power values of the plurality of fuel cell modules, and a difference between the largest value and the smallest value of the future output power values of the plurality of fuel cell modules is the smallest possible value.

In the fuel cell stack combining method according to the aspect of the present invention described in (4), combinations of the plurality of fuel cell stacks are determined so that the sum of the difference between the largest value and the smallest value of the output power values of the plurality of fuel cell modules, and the difference between the largest value and the smallest value of the future output power values of the plurality of fuel cell modules is the smallest possible value. It is therefore possible to effectively utilize each of the fuel cell stacks and to reduce variations in power load during operation thereof while ensuring a wider power draw range. Thus, it is possible to determine favorable combinations of the fuel cell stacks so as to contribute to longevity of the fuel cell stacks.

(5) The fuel cell stack combining method according to the aspect of the present invention described in (3) may further include: acquiring an output power value for each of the plurality of fuel cell modules by adding up the output power values of the set of fuel cell stacks included in the fuel cell module; estimating a future output power value for each of the plurality of fuel cell modules by adding up the future output power values of the set of fuel cell stacks included in the fuel cell module; and determining combinations of the plurality of fuel cell stacks so that a difference between the largest value and the smallest value of the output power values of the plurality of fuel cell modules is smaller than a difference between the largest value and the smallest value of the future output power values of the plurality of fuel cell modules.

In the fuel cell stack combining method according to the aspect of the present invention described in (5), combinations of the plurality of fuel cell stacks are determined so that the difference between the largest value and the smallest value of the output power values of the plurality of fuel cell modules is smaller than the difference between the largest value and the smallest value of the future output power values of the plurality of fuel cell modules. It is therefore possible to effectively utilize each of the fuel cell stacks and to reduce variations in power load during operation thereof while ensuring a wider power draw range. Thus, it is possible to determine favorable combinations of the fuel cell stacks so as to contribute to longevity of the fuel cell stacks.

(6) The fuel cell stack combining method according to the aspect of the present invention described in (1) may further include: ranking each of the plurality of fuel cell stacks based on a difference between the output power value of the fuel cell stack and the future output power value of the fuel cell stack; and determining combinations of the plurality of fuel cell stacks based on the ranks of the respective fuel cell stacks.

In the fuel cell stack combining method according to the aspect of the present invention described in (6), each of the plurality of fuel cell stacks is ranked based on the difference between the output power value thereof and the future output power value thereof, and combinations of the plurality of fuel cell stacks are determined based on the ranks of the respective fuel cell stacks. Thus, it is possible to determine more favorable combinations of the fuel cell stacks. For example, a fuel cell module obtained by combining ranks with a smaller difference can be used for a long-life-cycle application, and a fuel cell module obtained by combining ranks with a larger difference can be used for a short-life-cycle application. That is, it is possible to make optimal use of the fuel cell modules in respective applications.

(7) In the fuel cell stack combining method according to any one of the aspects of the present invention described in (1) to (6), at least one of the output power values of the set of fuel cell stacks connected in series in each of the plurality of fuel cell modules may be different from the others.

In the fuel cell stack combining method according to the aspect of the present invention described in (7), at least one of the output power values of each set of fuel cell stacks connected in series may be different from the others. Thus, it is possible to employ a used fuel cell stack and a different company's fuel cell stack with different specifications as at least one of the plurality of fuel cell stacks. This configuration allows for a wider range of choice for the fuel cell stacks and determination of more favorable combinations of the fuel cell stacks.

(8) In the fuel cell stack combining method according to any one of the aspects of the present invention described in (1) to (7), the specific period of time may be determined based on a period of use or a purpose of use of the fuel cell stacks.

In the fuel cell stack combining method according to the aspect of the present invention described in (8), the specific period of time is determined based on a period of use or a purpose of use of the fuel cell stacks. Thus, it is possible to determine more favorable combinations of the fuel cell stacks.

According to the present invention, it is possible to determine more favorable combinations of fuel cell stacks that form fuel cell modules.

BRIEF DESCRIPTION OF THE DRAWINGS

FIG. 2 is a flowchart for explaining a flow of the fuel cell stack combining method according to the embodiment of the present invention;

FIG. 7 is a schematic diagram illustrating a modification example of the fuel cell system.

DETAILED DESCRIPTION OF THE INVENTION

Hereinafter, an embodiment of the present invention is described in detail with reference to the accompanying drawings.

Figure 1:
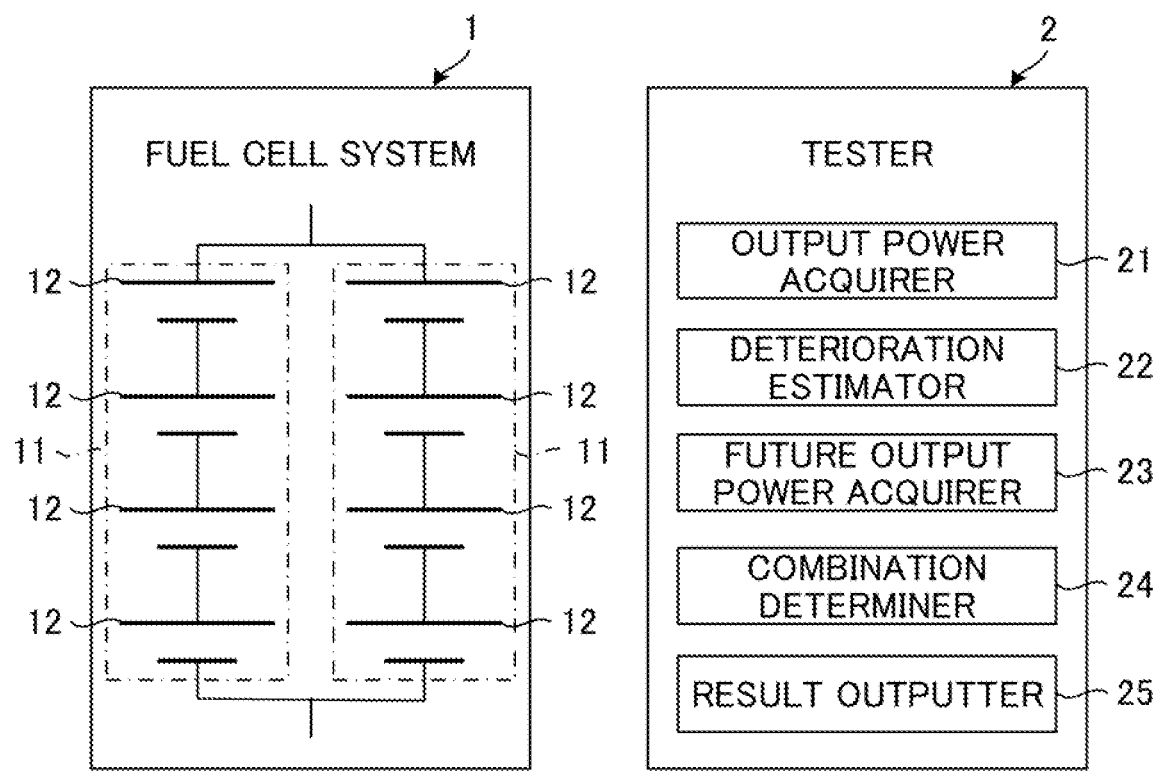
FIG. 1 is a block diagram illustrating a configuration of a fuel cell system and a tester that implement a fuel cell stack combining method according to an embodiment of the present invention.

First, referring to FIG. 1, the following describes a configuration of a fuel cell system 1 and a tester 2 that implement a method for combining fuel cell stacks 12 according to the embodiment of the present invention. FIG. 1 is a block diagram illustrating the configuration of the fuel cell system 1 and the tester 2 that implement the method for combining the fuel cell stacks 12.

The fuel cell system 1 illustrated in FIG. 1 includes a plurality of fuel cell modules 11 connected in parallel to one another. The fuel cell system 1 does not include a voltage controller such as a fuel cell vehicle control unit (FCVCU), and the voltages of the fuel cell modules 11 are the same as one another. It is demanded that the fuel cell system 1 have no variations in current-voltage characteristics between the plurality of fuel cell modules 11. In order to meet this demand, the tester 2 is used before the fuel cell system 1 is shipped to determine more favorable combinations of the plurality of fuel cell stacks 12 that form the fuel cell system 1. Thereafter, a worker or a work robot (not shown) recombines the fuel cell stacks 12 in accordance with the combinations determined by the tester 2.

Specifically, the fuel cell system 1 includes a plurality of fuel cell modules 11. Each of the fuel cell modules 11 includes a set of fuel cell stacks 12 connected in series to one another. The plurality of fuel cell modules 11 are connected in parallel to one another. In the drawings including FIG. 1, the fuel cell modules 11 are referred to as a first fuel cell module 11, a second fuel cell module 11, and so on in the order from the left. The fuel cell stacks 12 are referred to as a first fuel cell stack 12, a second fuel cell stack 12, and so on in the order from the top.

FIG. 1 shows, as an example, a case where each fuel cell module 11 includes four fuel cell stacks 12 connected in series to one another. However, the number of the fuel cell stacks 12 is not limited to four, and may be two, three, or five or more. FIG. 1 shows, as an example, a case where the fuel cell system 1 includes two fuel cell modules 11 connected in parallel to one another. However, the number of the fuel cell modules 11 is not limited to two, and may be three or more.

The plurality of fuel cell stacks 12 are individually identifiable to be managed by the tester 2. Specifically, the tester 2 manages each of the fuel cell stacks 12 by identifying the ordinal number of the fuel cell module 11 including the fuel cell stack 12 and identifying the ordinal number of the fuel cell stack 12 in the fuel cell module 11. For example, the tester 2 manages the first fuel cell stack 12 in the second fuel cell module 11 using a number (2,1).

The tester 2 is used before the fuel cell system 1 is shipped to determine combinations of the plurality of fuel cell stacks 12 that form the fuel cell system 1. Specifically, the tester 2 includes an output power acquirer 21, a deterioration estimator 22, a future output power estimator 23, a combination determiner 24, and a result outputter 25.

The tester 2 includes, for example, a microprocessor having a computer processing unit (CPU), random access memory (RAM), read only memory (ROM), an input/output (I/O) device, and the like. The CPU executes programs read out of the ROM or other storage devices. Specifically, the CPU executes the programs by reading information out of the RAM, the ROM, or other storage devices, writing the information to the RAM or other storage devices, and transmitting and receiving signals to and from a communication device, not shown. As described above, hardware and software (programs) work together to implement the processing in the present embodiment.

The output power acquirer 21 acquires an output power value for each of the plurality of fuel cell stacks 12. The output power acquirer 21 also acquires an output power value for each of the plurality of fuel cell modules 11 by adding up the output power values of the set of fuel cell stacks 12 included in the fuel cell module 11.

The deterioration estimator 22 estimates a degree of future deterioration for each of the plurality of fuel cell stacks 12. Specifically, for each of the plurality of fuel cell stacks 12, the deterioration estimator 22 causes extremely slight deterioration through an extremely-short-term use and estimates the degree of future deterioration that is likely to result from a long-term use based on the degree of deterioration resulting from the extremely-short-term use. The degree of deterioration may be acquired as data corresponding to an output power value from a database or from external big data.

The future output power estimator 23 estimates, for each of the plurality of fuel cell stacks 12, a future output power value, which is a value of power that is likely to be outputted after a specific period of time has passed, based on the degree of future deterioration estimated by the deterioration estimator 22. The future output power estimator 23 also estimates a future output power value for each of the plurality of fuel cell modules 11 by adding up the future output power values of the set of fuel cell stacks 12 included in the fuel cell module 11. The specific period of time is determined based on a period of use or a purpose of use of the fuel cell stacks 12. The future output power value may be acquired as data corresponding to a degree of deterioration from a database or from external big data.

The combination determiner 24 determines combinations of the plurality of fuel cell stacks 12 based on differences in the output power value between the plurality of fuel cell stacks 12 and differences in the future output power value between the plurality of fuel cell stacks 12.

Specifically, the combination determiner 24 determines combinations of the plurality of fuel cell stacks 12 based on a difference in the output power value between the plurality of fuel cell modules 11 and a difference in the future output power value between the plurality of fuel cell modules 11. More specifically, the combination determiner 24 determines combinations of the plurality of fuel cell stacks 12 so that the sum of the difference between the largest value and the smallest value of the output power values of the plurality of fuel cell modules 11, and the difference between the largest value and the smallest value of the future output power values of the plurality of fuel cell modules 11 is the smallest possible value.

Alternatively, the combination determiner 24 determines combinations of the plurality of fuel cell stacks 12 so that the sum of the output power values of the set of fuel cell stacks 12 is the smallest possible value based on the difference between the largest value and the smallest value of the output power values of the plurality of fuel cell stacks 12, and the difference between the largest value and the smallest value of the future output power values of the plurality of fuel cell stacks 12. More specifically, the combination determiner 24 determines combinations of the plurality of fuel cell stacks 12 so that the difference between the largest value and the smallest value of the output power values of the plurality of fuel cell modules 11 is smaller than the difference between the largest value and the smallest value of the future output power values of the plurality of fuel cell modules 11.

Alternatively, the combination determiner 24 ranks each of the plurality of fuel cell stacks 12 based on the difference between the output power value of the fuel cell stack 12 and the future output power value of the fuel cell stack 12, and determines combinations of the plurality of fuel cell stacks 12 based on the ranks of the respective fuel cell stacks 12.

The result outputter 25 is a monitor that outputs information to the worker or a communication device that outputs a signal to the work robot (not shown). The result outputter 25 outputs the combinations of the fuel cell stacks 12 determined by the combination determiner 24 to the worker or the work robot (not shown). For example, in a case where the combinations of the fuel cell stacks 12 determined by the combination determiner 24 is achieved by interchanging the fuel cell stack 12 numbered (2,1) with the fuel cell stack 12 numbered (1,2), the result outputter 25 outputs information ordering the interchange of the fuel cell stack 12 numbered (2,1) with the fuel cell stack 12 numbered (1,2). Thereafter, the worker or the work robot (not shown) recombines the fuel cell stacks 12 in accordance with the combinations outputted by the result outputter 25.

Referring to FIG. 2, the following describes a flow of the method for combining the fuel cell stacks 12 according to the embodiment of the present invention. FIG. 2 is a flowchart for explaining the flow of the method for combining the fuel cell stacks 12.

The method for combining the fuel cell stacks 12 (see FIG. 1) shown in FIG. 2 is a method for determining combinations of the plurality of fuel cell stacks 12 (see FIG. 1) that form the fuel cell system 1 (see FIG. 1) using the tester 2 (see FIG. 1). Specifically, the method for combining the fuel cell stacks 12 (see FIG. 1) includes an output power acquisition step S11, a deterioration estimation step S12, a future output power estimation step S13, a combination determination step S14, a result output step 315, and a recombination step 316.

In the output power acquisition step S11, the output power acquirer 21 (see FIG. 1) acquires an output power value for each of the plurality of fuel cell stacks 12 (see FIG. 1) and acquires an output power value for each of the plurality of fuel cell modules 11 (see FIG. 1). After the output power acquisition step 311, the process advances to the deterioration estimation step S12.

In the deterioration estimation step S12, the deterioration estimator 22 (see FIG. 1) estimates a degree of future deterioration for each of the plurality of fuel cell stacks 12 (see FIG. 1). After the deterioration estimation step S12, the process advances to the future output power estimation step S13.

In the future output power estimation step S13, the future output power estimator 23 (see FIG. 1) estimates a future output power value for each of the plurality of fuel cell stacks 12 (see FIG. 1) and estimates a future output power value for each of the plurality of fuel cell modules 11 (see FIG. 1). After the future output power estimation step S13, the process advances to the combination determination step S14.

In the combination determination step S14, the combination determiner 24 (see FIG. 1) determines combinations of the plurality of fuel cell stacks 12 (see FIG. 1). After the combination determination step S14, the process advances to the result output step S15.

In the result output step S15, the result outputter 25 (see FIG. 1) outputs the combinations of the fuel cell stacks 12 (see FIG. 1) determined in the combination determination step S14 to a worker or a work robot (not shown). After the result output step S15, the process advances to the recombination step S16.

In the recombination step S16, the worker or the work robot (not shown) recombines the fuel cell stacks 12 (see FIG. 1) in accordance with the combinations outputted in the result output step S15. After the recombination step S16, the process comes to an end.

Figure 3A:
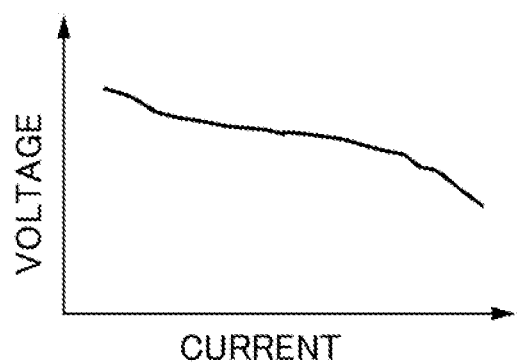
FIG. 3A is a diagram showing current-voltage characteristics of a fuel cell stack.
Figure 3B:
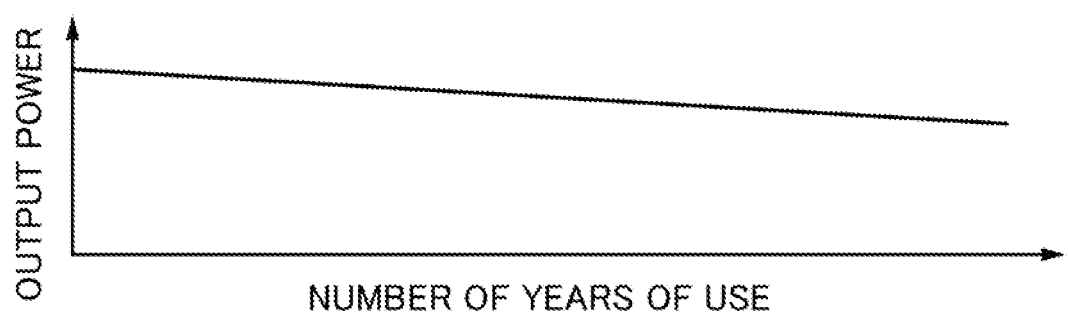
FIG. 3B is a diagram showing decrease in output power of a fuel cell stack due to aging.

Referring to FIGS. 3A and 3B, the following describes current-voltage characteristics of the fuel cell stacks 12 (see FIG. 1) and decrease in output power of the fuel cell stacks 12 (see FIG. 1) due to aging. FIG. 3A is a diagram showing the current-voltage characteristics of a fuel cell stack 12 (see FIG. 1). FIG. 3B is a diagram showing decrease in output power of a fuel cell stack 12 (see FIG. 1) due to aging.

Each fuel cell stack 12 (see FIG. 1) has current-voltage characteristics specific to the fuel cell stack as shown in FIG. 3A. Due to the fuel cell modules having the same voltage, which is a characteristic of a parallel circuit, variations in current-voltage characteristics, if any, between the plurality of fuel cell stacks can interfere with power output from the fuel cell stacks that form the fuel cell module having lower characteristics.

The future output power value of each fuel cell stack 12 (see FIG. 1) decreases with aging as shown in FIG. 3B. This future output power value is estimated by the future output power estimator 23. According to the present embodiment, favorable combinations of the fuel cell stacks are determined with the future output power value estimated by the future output power estimator 23 taken into account.

Figure 4A:
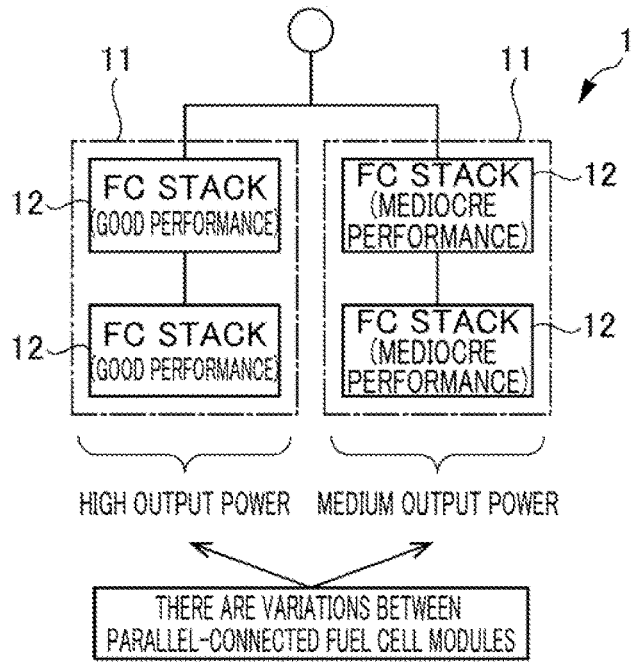
FIG. 4A is a schematic diagram for explaining whether combinations of fuel cell stacks are good or bad and illustrates a case of bad combinations of the fuel cell stacks.
Figure 4B:
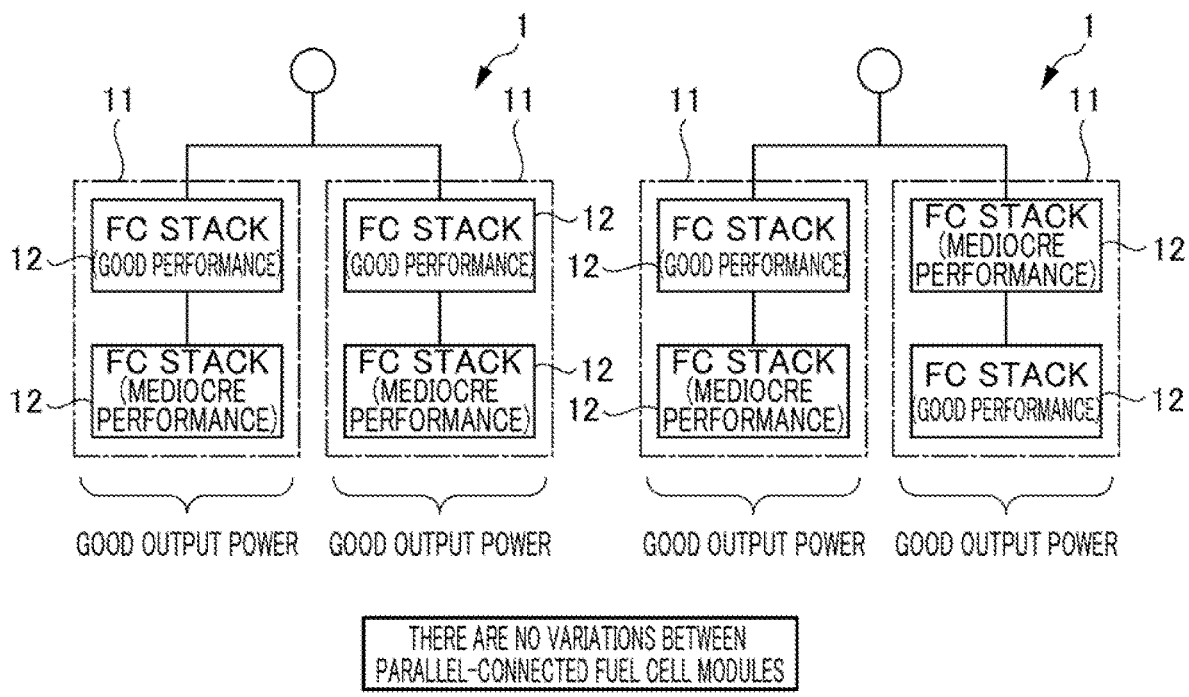
FIG. 4B is a schematic diagram for explaining whether combinations of the fuel cell stacks are good or bad and illustrates cases of good combinations of the fuel cell stacks.
Figure 5A:
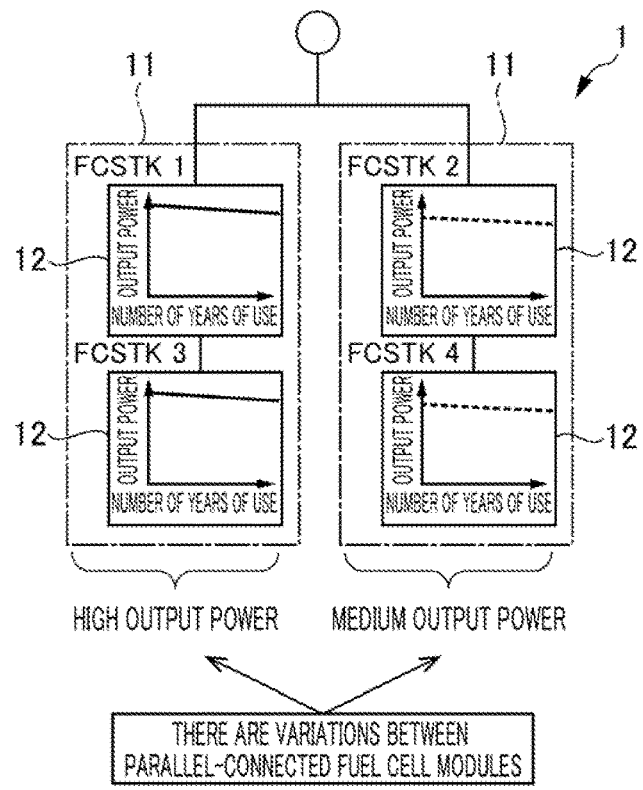
FIG. 5A is a schematic diagram for explaining whether combinations of the fuel cell stacks are good or bad and illustrates a case of bad combinations of the fuel cell stacks.
Figure 5B:
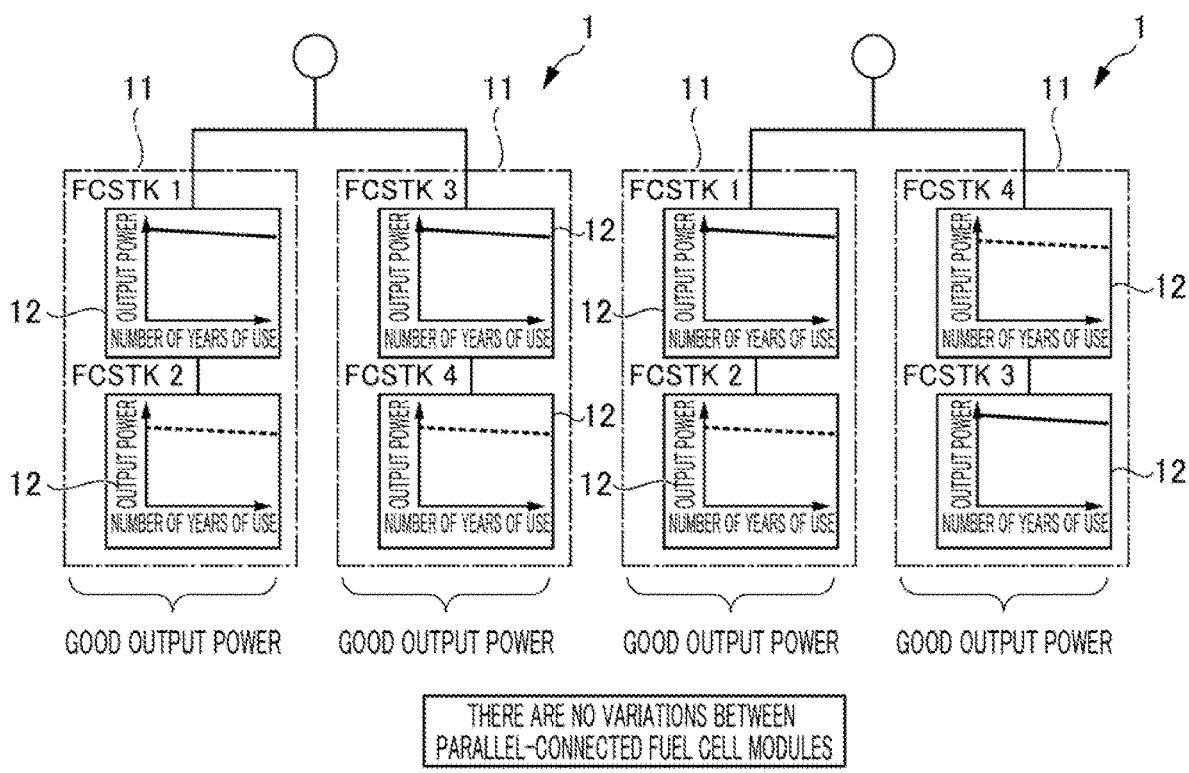
FIG. 5B is a schematic diagram for explaining whether combinations of the fuel cell stacks are good or bad and illustrates cases of good combinations of the fuel cell stacks.

Referring to FIGS. 4A, 48, 5A, and 5B, the following describes good and bad combinations of fuel cell stacks 12. FIG. 4A is a schematic diagram for explaining whether combinations of the fuel cell stacks 12 are good or bad and illustrates a case of bad combinations of the fuel cell stacks 12. FIG. 4B is a schematic diagram for explaining whether combinations of the fuel cell stacks 12 are good or bad and illustrates cases of good combinations of the fuel cell stacks 12. FIG. 5A is a schematic diagram for explaining whether combinations of the fuel cell stacks 12 are good or bad and illustrates a case of bad combinations of the fuel cell stacks 12. FIG. 5B is a schematic diagram for explaining whether combinations of the fuel cell stacks 12 are good or bad and illustrates cases of good combinations of the fuel cell stacks 12.

In the case illustrated in FIG. 4A where the performance of the fuel cell stack 12 numbered (1,1) is good, the performance of the fuel cell stack 12 numbered (1,2) is good, the performance of the fuel cell stack 12 numbered (2,1) is mediocre, and the performance of the fuel cell stack 12 numbered (2,2) is mediocre, the output power of the first fuel cell module 11 is high, and the output power of the second fuel cell module 11 is medium. That is, in this case, there are variations in current-voltage characteristics between the plurality of fuel cell modules 11 connected in parallel to one another.

In one case illustrated in FIG. 4B where the performance of the fuel cell stack 12 numbered (1,1) is good, the performance of the fuel cell stack 12 numbered (1,2) is mediocre, the performance of the fuel cell stack 12 numbered (2,1) is good, and the performance of the fuel cell stack 12 numbered (2,2) is mediocre, the output power of the first fuel cell module 11 is good, and the output power of the second fuel cell module 11 is good. That is, in this case, there are no variations in current-voltage characteristics between the plurality of fuel cell modules 11 connected in parallel to one another.

In the other case illustrated in FIG. 4B where the performance of the fuel cell stack 12 numbered (1,1) is good, the performance of the fuel cell stack 12 numbered (1,2) is mediocre, the performance of the fuel cell stack 12 numbered (2,1) is mediocre, and the performance of the fuel cell stack 12 numbered (2,2) is good, the output power of the first fuel cell module 11 is good, and the output power of the second fuel cell module 11 is good. That is, in this case, there are no variations in current-voltage characteristics between the plurality of fuel cell modules 11 connected in parallel to one another.

In the case illustrated in FIG. 5A where the output power value and the future output power value of the fuel cell stack 12 numbered (1,1) are relatively high, the output power value and the future output power value of the fuel cell stack 12 numbered (1,2) are relatively high, the output power value and the future output power value of the fuel cell stack 12 numbered (2,1) are relatively low, and the output power value and the future output power value of the fuel cell stack 12 numbered (2,2) are relatively low, the output power of the first fuel cell module 11 is high, and the output power of the second fuel cell module 11 is medium. That is, in this case, there are variations in current-voltage characteristics between the plurality of fuel cell modules 11 connected in parallel to one another.

In one case illustrated in FIG. 5B where the output power value and the future output power value of the fuel cell stack 12 numbered (1,1) are relatively high, the output power value and the future output power value of the fuel cell stack 12 numbered (1,2) are relatively low, the output power value and the future output power value of the fuel cell stack 12 numbered (2,1) are relatively high, and the output power value and the future output power value of the fuel cell stack 12 numbered (2,2) are relatively low, the output power of the first fuel cell module 11 is good, and the output power of the second fuel cell module 11 is good. That is, in this case, there are no variations in current-voltage characteristics between the plurality of fuel cell modules 11 connected in parallel to one another.

In the other case illustrated in FIG. 5B where the output power value and the future output power value of the fuel cell stack 12 numbered (1,1) are relatively high, the output power value and the future output power value of the fuel cell stack 12 numbered (1,2) are relatively low, the output power value and the future output power value of the fuel cell stack 12 numbered (2,1) are relatively low, and the output power value and the future output power value of the fuel cell stack 12 numbered (2,2) are relatively high, the output power of the first fuel cell module 11 is good, and the output power of the second fuel cell module 11 is good. That is, in this case, there are no variations in current-voltage characteristics between the plurality of fuel cell modules 11 connected in parallel to one another.

Due to the fuel cell modules having the same voltage, which is a characteristic of a parallel circuit, variations in current-voltage characteristics between the plurality of fuel cell stacks as in the cases illustrated in FIGS. 4A and 5A can interfere with power output from the fuel cell stacks forming the fuel cell module having lower characteristics. By contrast, according to the present embodiment, it is possible to determine such combinations of the fuel cell stacks that form the fuel cell modules as illustrated in FIGS. 4B and 5B where there are no variations between the fuel cell modules connected in parallel to one another, while avoiding such combinations of the fuel cell stacks that form the fuel cell modules as illustrated in FIGS. 4A and 5A where there are variations between the fuel cell modules connected in parallel to one another.

Figure 6A:
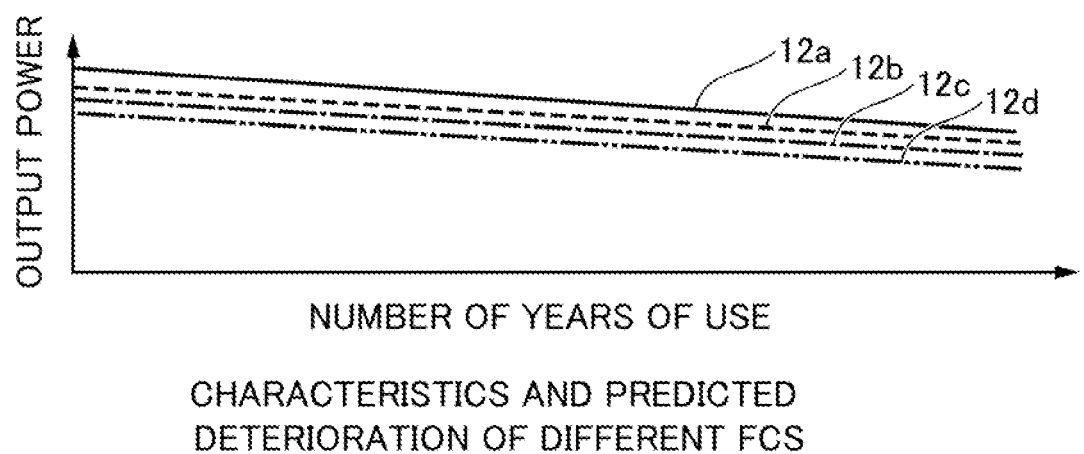
FIG. 6A is a diagram showing decrease in output power due to aging in different types of fuel cell stacks.
Figure 6B:
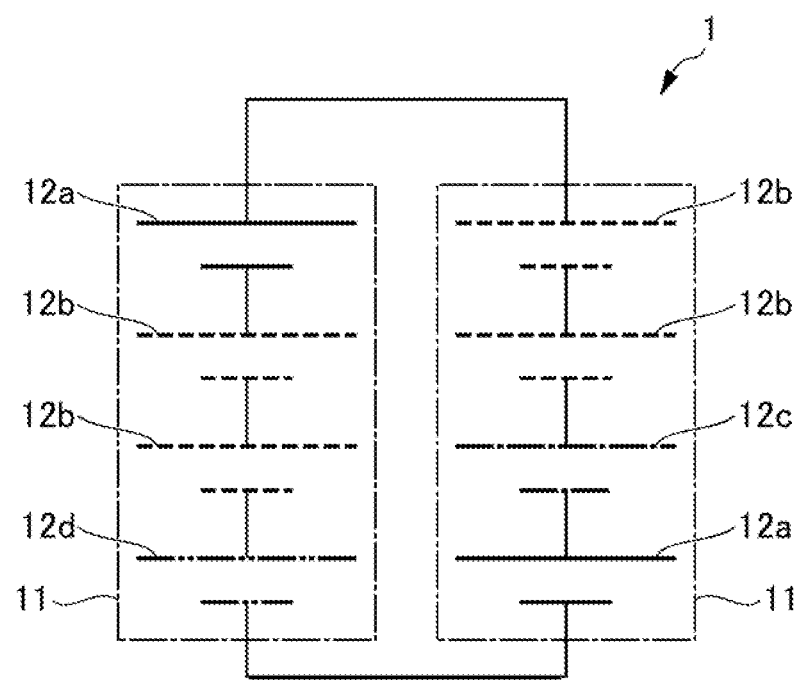
FIG. 6B is a schematic diagram illustrating a fuel cell system obtained by combining the different types of fuel cell stacks.

Referring to FIGS. 6A and 6B, the following describes decrease in output power due to aging in different types of fuel cell stacks 12 and a configuration of the fuel cell system 1 obtained by combining the different types of fuel cell stacks 12. FIG. 6A is a diagram showing decrease in output power due to aging in the different types of fuel cell stacks 12. FIG. 6B is a schematic diagram illustrating the fuel cell system 1 obtained by combining the different types of fuel cell stacks 12.

FIG. 6A shows four lines that represent decrease in output power due to aging in different types of fuel cell stacks 12a to 12d (see FIG. 6B). The first line from the top represents, for example, the output power value and the future output power value of the fuel cell stack 12a (see FIG. 6B), which is a high-power fuel cell stack produced by our company and is a new one. The second line from the top represents, for example, the output power value and the future output power value of the fuel cell stack 12b (see FIG. 6B), which is a low-power fuel cell stack produced by our company and is a used one. The third line from the top represents, for example, the output power value and the future output power value of the fuel cell stack 12c (see FIG. 6B), which is a low-power fuel cell stack produced by our company and is a new one. The fourth line from the top represents, for example, the output power value and the future output power value of the fuel cell stack 12d (see FIG. 6B), which is a fuel cell stack produced by another company.

FIG. 6B shows an example of a case where at least one of the output power values of each set of fuel cell stacks connected in series is different from the others. The fuel cell stack 12a numbered (1,1) is a high-power fuel cell stack produced by our company and is a new one. The fuel cell stack 12b numbered (1,2) is a low-power fuel cell stack produced by our company and is a new one. The fuel cell stack 12b numbered (1,3) is a low-power fuel cell stack produced by our company and is a new one. The fuel cell stack 12d numbered (1,4) is a fuel cell stack produced by another company. The fuel cell stack 12b numbered (2,1) is a low-power fuel cell stack produced by our company and is a new one. The fuel cell stack 12b numbered (2,2) is a low-power fuel cell stack produced by our company and is a new one. The fuel cell stack 12c numbered (2,3) is a fuel cell stack produced by our company and is a used one. The fuel cell stack 12a numbered (2,4) is a high-power fuel cell stack produced by our company and is a new one.

As described above, in the method for combining the fuel cell stacks 12, combinations of the plurality of fuel cell stacks 12 are determined based on differences in the output power value between the plurality of fuel cell stacks 12 and differences in the future output power value between the plurality of fuel cell stacks 12. This method therefore makes it possible to determine more favorable combinations of the fuel cell stacks 12 than a method in which combinations of a plurality of fuel cell stacks are determined based only on differences in the output power value between the plurality of fuel cell stacks.

In the method for combining the fuel cell stacks 12, the output power value and the future output power value may be acquired for each of the fuel cell modules 11 each including a set of fuel cell stacks 12 connected in series to one another, and combinations of the plurality of fuel cell stacks 12 may be determined based on the output power value and the future output power value acquired. In this case, it is possible to determine more favorable combinations of the plurality of fuel cell stacks 12.

In the method for combining the fuel cell stacks 12, combinations of the plurality of fuel cell stacks 12 may be determined based on the difference between the largest value and the smallest value of the output power values of the plurality of fuel cell stacks 12, and the difference between the largest value and the smallest value of the future output power values of the plurality of fuel cell stacks 12. In this case, it is possible to effectively utilize each of the fuel cell stacks and to reduce variations in power load during operation thereof while ensuring a wider power draw range. Thus, it is possible to determine favorable combinations of the fuel cell stacks 12 so as to contribute to longevity of the fuel cell stacks 12.

In the method for combining the fuel cell stacks 12, combinations of the plurality of fuel cell stacks 12 may be determined so that the sum of the difference between the largest value and the smallest value of the output power values of the plurality of fuel cell modules 11, and the difference between the largest value and the smallest value of the future output power values of the plurality of fuel cell modules 11 is the smallest possible value. In this case, it is possible to effectively utilize each of the fuel cell stacks and to reduce variations in power load during operation thereof while ensuring a wider power draw range. Thus, it is possible to determine favorable combinations of the fuel cell stacks 12 so as to contribute to longevity of the fuel cell stacks 12.

In the method for combining the fuel cell stacks 12, combinations of the plurality of fuel cell stacks 12 may be determined so that the difference between the largest value and the smallest value of the output power values of the plurality of fuel cell modules 11 is smaller than the difference between the largest value and the smallest value of the future output power values of the plurality of fuel cell modules 11. In this case, it is possible to effectively utilize each of the fuel cell stacks and to reduce variations in power load during operation thereof while ensuring a wider power draw range. Thus, it is possible to determine favorable combinations of the fuel cell stacks 12 so as to contribute to longevity of the fuel cell stacks 12.

In the method for combining the fuel cell stacks 12, each of the plurality of fuel cell stacks 12 may be ranked based on the difference between the output power value of the fuel cell stack and the future output power value of the fuel cell stack, and combinations of the plurality of fuel cell stacks 12 may be determined based on the ranks of the respective fuel cell stacks 12. In this case, it is possible to determine more favorable combinations of the fuel cell stacks 12. For example, a fuel cell module obtained by combining ranks with a smaller difference can be used for a long-life-cycle application, and a fuel cell module obtained by combining ranks with a larger difference can be used for a short-life-cycle application. That is, it is possible to make optimal use of the fuel cell modules in respective applications.

In the method for combining the fuel cell stacks 12, at least one of the output power values of each set of fuel cell stacks connected in series may be different from the others. Thus, it is possible to employ a used fuel cell stack and a different company's fuel cell stack with different specifications as at least one of the plurality of fuel cell stacks. This configuration allows for a wider range of choice for the fuel cell stacks and determination of more favorable combinations of the fuel cell stacks.

In the method for combining the fuel cell stacks 12, the specific period of time is determined based on a period of use or a purpose of use of the fuel cell stacks 12. Thus, it is possible to determine more favorable combinations of the fuel cell stacks 12.

Referring to FIG. 7, the following describes a configuration of a modification example of the fuel cell system 1. FIG. 7 is a schematic diagram illustrating the modification example of the fuel cell system 1.

The fuel cell system 1 illustrated in FIG. 7 includes a plurality of fuel cell modules 11 connected in parallel to one another in which the first fuel cell module 11 has a larger difference between the output power value thereof and the future output power value thereof. This fuel cell system 1 includes, as an output power adjuster, a variable resistor 13 connected in series to the first fuel cell module 11. Because of the variable resistor 13, the fuel cell system 1 according to the present modification example can prevent decrease in output power.

Note that the present invention is not limited to the foregoing embodiment, and changes such as modifications and improvements to the extent that the objective of the present invention is achieved are encompassed by the present invention.

For example, the foregoing embodiment is described using, as an example, the case where the fuel cell stacks 12 included in the fuel cell system 1 are recombined depending on results of tests in the fuel cell system 1, but the present invention is not limited as such. Alternatively, a replacement fuel cell stack 12 may be tested when the tests in the fuel cell system 1 are performed, and any of the fuel cell stacks 12 included in the fuel cell system 1 may be removed, so that the replacement fuel cell stack 12 is included.

The foregoing embodiment is described using, as an example, the case where the fuel cell stacks 12 included in the fuel cell system 1 are recombined depending on results of tests in the fuel cell system 1, but the present invention is not limited as such. Alternatively, a fuel cell stack(s) 12 removed from the fuel cell system 1 and a replacement fuel cell stack 12 may be tested, and these fuel cell stacks 12 may be included.

The foregoing embodiment is described using, as an example, the case where the combination determiner 24 forming the tester 2 determines combinations of the fuel cell stacks 12. Alternatively, a worker may determine combinations of the fuel cell stacks 12 based on test results outputted by the tester 2.

EXPLANATION OF REFERENCE NUMERALS

1: Fuel cell system
11: Fuel cell module
12, 12a to 12d: Fuel cell stack
13: Variable resistor
2: Tester
21: Output power acquirer
22: Deterioration estimator
23: Future output power estimator 24: Combination determiner
25: Result outputter
S11: Output power acquisition step
S12: Deterioration estimation step
S13: Future output power estimation step
S14: Combination determination step
S15: Result output step
S16: Recombination step

What is claimed is:

1. A fuel cell stack combining method for determining combinations of a plurality of fuel cell stacks that form a fuel cell system using a tester,
the fuel cell system including
a plurality of fuel cell modules each including a set of fuel cell stacks from the plurality of fuel cell stacks, the plurality of fuel cell modules being connected in parallel to one another, the set of fuel cell stacks being connected in series to one another,
the tester is configured of a microprocessor, and including:
an output power acquirer configured to acquire an output power value for each of the plurality of fuel cell stacks;
a deterioration estimator configured to estimate a degree of future deterioration for each of the plurality of fuel cell stacks; and
a future output power estimator configured to estimate, for each of the plurality of fuel cell stacks, a future output power value based on the degree of future deterioration estimated by the deterioration estimator, the future output power value being a value of power that is likely to be outputted after a specific period of time has passed,
in a state that the fuel cell modules are connected in parallel and in the fuel cell modules the fuel cell stacks are connected in series, the fuel cell stack combining method comprising that the microprocessor determining combinations of the plurality of fuel cell stacks based on differences in the output power value between the plurality of fuel cell stacks and differences in the future output power value between the plurality of fuel cell stacks.

2. The fuel cell stack combining method according to claim 1, further comprising:
acquiring an output power value for each of the plurality of fuel cell modules by adding up the output power values of the set of fuel cell stacks included in the fuel cell module;
estimating a future output power value for each of the plurality of fuel cell modules by adding up the future output power values of the set of fuel cell stacks included in the fuel cell module; and
determining combinations of the plurality of fuel cell stacks based on a difference in the output power value between the plurality of fuel cell modules and a difference in the future output power value between the plurality of fuel cell modules.

3. The fuel cell stack combining method according to claim 1, wherein combinations of the plurality of fuel cell stacks are determined so that a sum of the output power values of the set of fuel cell stacks is the smallest possible value based on a difference between the largest value and the smallest value of the output power values of the plurality of fuel cell stacks, and a difference between the largest value and the smallest value of the future output power values of the plurality of fuel cell stacks.

4. The fuel cell stack combining method according to claim 2, wherein combinations of the plurality of fuel cell stacks are determined so that a sum of a difference between the largest value and the smallest value of the output power values of the plurality of fuel cell modules, and a difference between the largest value and the smallest value of the future output power values of the plurality of fuel cell modules is the smallest possible value.

5. The fuel cell stack combining method according to claim 3, further comprising:
acquiring an output power value for each of the plurality of fuel cell modules by adding up the output power values of the set of fuel cell stacks included in the fuel cell module;
estimating a future output power value for each of the plurality of fuel cell modules by adding up the future output power values of the set of fuel cell stacks included in the fuel cell module; and
determining combinations of the plurality of fuel cell stacks so that a difference between the largest value and the smallest value of the output power values of the plurality of fuel cell modules is smaller than a difference between the lamest value and the smallest value of the future output power values of the plurality of fuel cell modules.

6. The fuel cell stack combining method according to claim 1, further comprising:
ranking each of the plurality of fuel cell stacks based on a difference between the output power value of the fuel cell stack and the future output power value of the fuel cell stack; and
determining combinations of the plurality of fuel cell stacks based on the ranks of the respective fuel cell stacks.

7. The fuel cell stack combining method according to claim 1, wherein at least one of the output power values of the set of fuel cell stacks connected in series in each of the plurality of fuel cell modules is different from the others.

8. The fuel cell stack combining method according to claim 1, wherein the specific period of time is determined based on a period of use or a purpose of use of the fuel cell stacks.

9. The fuel cell stack combining method according to claim 1, wherein the tester includes a combination determiner that determines a combination of the fuel cell stacks,
the stacked fuel cell stacks are recombined based on a decision of the combination determiner.

* * * * *